United States Patent Office 2,856,396
Patented Oct. 14, 1958

2,856,396
METALLISABLE AZO DYESTUFFS AND PROCESS FOR THE PRODUCTION THEREOF

Rudolf Dürig, Basel, Switzerland, assignor to J. R. Geigy A.-G., Basel, Switzerland, a Swiss firm No Drawing. Application May 20, 1957
Serial No. 660,053

Claims priority, application Switzerland June 1, 1956

7 Claims. (Cl. 260—146)

The present invention concerns metallisable azo dyestuffs, their complex heavy metal compounds and also the production of these dyestuffs. The invention also concerns the use of these dyestuffs for the fast dyeing of natural and synthetic fibres in olive, green, blue to green shades, as well as the material dyed with the aid of these dyestuffs.

It has been found that valuable metallisable azo dyestuffs are obtained if diazotised aromatic amines containing in the ortho-position to the primary amino groups substituents which are capable of forming the metal complex or substituents which can be converted into such, are coupled with 2-hydroxy-4-methyl-(hydroxy-sulphobenzo)-quinolines of the general Formula I

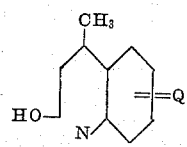

(I)

The azo dyestuffs so obtained are then treated in substance or on the fibre with agents giving off heavy metal.

In the above formula Q represents a benzo radical bound at an angle to the quinoline ring which contains a sulphonic acid and a hydroxyl group in the meta-position to each other.

The diazonium compounds are coupled with the 2-hydroxy-4-methyl-(hydroxy-sulphobenzo)-quinolines according to the present invention which couple in the ortho-position to the isocyclically bound hydroxyl group, in aqueous/alkaline agents, e. g. in aqueous solution of sodium carbonate or ammonia or in an aqueous suspension of MgO. Often the addition of substances which accelerate the coupling is recommended such as e. g. pyridine bases, tertiary alkanolamines or trialkylamines.

Azo components according to the general Formula I are 2-hydroxy-4-methyl quinoline derivatives which contain an (m-hydroxy)-sulphobenzo radical bound at an angle to the quinoline ring and which correspond to the general Formulae a or b:

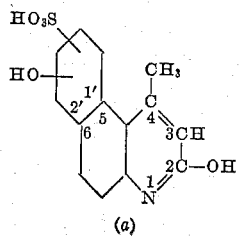

(a)

(b)

Examples of such benzoquinolines according to the present invention are: 2-hydroxy-4-methyl-5.6-(6'-hydroxybenzo)-quinoline-4'-sulphonic acid, 2-hydroxy-4-methyl-5.6-(4'-hydroxybenzo)-quinoline-6'-sulphonic acid and 2-hydroxy-4-methyl-5.6-(3'-hydroxybenzo)-quinoline-5'-sulphonic acid; also 2-hydroxy-4-methyl-7.8-(6'-hydroxybenzo)-quinoline-4'-sulphonic acid and 2-hydroxy-4-methyl-7.8-(3'-hydroxybenzo)-quinoline - 5' - sulphonic acid.

Diazotised mono- or poly-valent aromatic amines of the isocyclic and heterocyclic series are used as diazo components, which, in the o-position to the primary amino groups, contain substituents which are capable of forming the metal complex. Also compounds can be used in which these complex forming groups are only formed during the metallising reaction.

Of particular interest however, are amines which already contain one or more arylazo groups and in particular those which correspond to the general Formula II $$A—N=N—B—NH_2 \qquad (II)$$

In this formula: A represents an aromatic radical of the isocyclic and heterocyclic series which can also contain an arylazo group as substituent, this, in isocyclic compounds, being advantageously in p-position to the azo linkage, B represents a radical from the series of mono- and di-nuclear, aromatic-isocyclic, possibly substituted hydrocarbons in which the azo and the primary amino group are in the 1.4- or 1.4'-positions to each other and in which, of the neighbouring positions to these two substituents, at least that of the amino group is occupied by a metallisable group or by a substituent which can be converted into such a group.

Of the aminoazo dyestuffs of this general Formula II in which B represents a benzene or naphthalene radical which contains the azo and the primary amino group bound in the 1.4-position to each other, chiefly the p-amino monoazo dyestuffs are used. These can contain the substituents usual in azo dyestuffs, e. g., halogen, hydroxyl, alkyl, alkoxy, acylamino, nitro, carboxyl, sulphonic acid, carbamide and sulphonic acid amide groups. They are obtained by coupling any diazotised monoamines desired, those for example of the benzene, naphthalene, stilbene, diphenyl or heterocyclic-aromatic series, which e. g. can belong to the thiazole, triazole or tetrazole series and are starting components generally used in polyazo dyestuffs, with amino compounds of the benzene and naphthalene series which couple in the p-position to the primary amino group and contain in the o-position to this group a substituent which forms the metal complex.

Examples of starting components corresponding to the symbol A—NH₂ which lead to the p-amino monoazo dyestuffs of the general Formula II are: 1-aminobenzene-3- or -4-sulphonic acid, 1-aminobenzene-2.4- or -2.5-disulphonic acid, 4.6 dimethyl-1-aminobenzene-2-sulphonic acid, 5-amino-2-chlorobenzene-1-sulphonic acid, 1-aminobenzene-3- or -4-carboxylic acid, 5-amino-2-hydroxybenzene-1-carboxylic acid, 5-amino-2-hydroxy-3-sulphobenzene-1-carboxylic acid, 5-(3'- or 4'-aminobenzoyl)-amino-2-hydroxybenzene-1-carboxylic acid, 4-amino-diphenyl-3-sulphonic acid, 4-nitro- or 4-acetylamino- or 4-benzoylamino- 4'-amino-stilbene-2.2'-disulphonic acid, 1-aminonaphthalene-4-, -5-, -6- or -7-sulphonic acid, 2-aminonaphthalene-3.6- or -5.7- or -4.8- disulphonic acid, 1-aminonaphthalene-3.6-disulphonic acid, 2-(4'-aminophenyl)-5-methyl-benzthiazole-mono- or di-sulphonic acids, 2-(4'-aminophenyl)-naphtho-triazole-5.7-disulphonic acid, 4-[(4'.5':1".2"-naphtho)-1'.2'.3'-triazolyl-(2)]-4-aminostilbene-2.2'.6"- or -2.2'.5"-trisulphonic acid and 2-(4'-aminophenyl)-naphthothiazole-5.7-disulphonic acid.

The usual middle components used in metallisable polyazo dyestuffs can be used as amino compounds of the benzene and naphthalene series corresponding to the symbol B—NH₂ which as well as coupling in the p-position to the primary amino group also contain a metallisable group in the o-position to that group and which, together with the starting components defined above, lead to the p-amino monoazo dyestuffs. In particular those are used which contain a methoxy, ethoxy or carboxymethoxy group as metallisable group or as a substituent which can be converted into such a group.

However, also compounds which already contain an arylazo group can be used as starting components according to the symbol A—NH₂. Here, advantageously again p-amino monoazo dyestuffs are used and in particular those which can be produced from components as described. But also other amino azo compounds can be used as starting components containing azo groups, for example those which are derived from 4-aminobenzene and substitution products thereof.

The amino mono and dis-azo dyestuffs are diazotised in the usual way. Often the indirect method is used with advantage, i. e. the solution of their alkali salts which contains alkali nitrite is poured in the cold into mineral acids.

Valuable dyestuffs are also disazo and trisazo dyestuffs from benzoquinoline sulphonic acids according to the present invention and diazonium derivatives of such compounds of the general Formula II in which the symbol B represents two benzene rings bound by direct linkage or by a bridging member. In these compounds an o-position to the primary amino group and possibly also to the azo group, is occupied by a metallisable substituent or one which can be converted into such. Examples of bridging members are carbamide, carbaminyl and ethylene radicals. Such dis- and trisazo dyestuffs are obtained by tetrazotising diamines of the formula H₂N—B—NH₂, in which B has the meaning given above, and then coupling with one mol of a usual azo component, such as e. g. salicylic acid and, in particular, with a hydroxynaphthalene sulphonic acid, amino hydroxynaphthalene sulphonic acid or (arylazo)-amino-hydroxynaphthalene sulphonic acid, whereupon the diazo-azo dyestuff is coupled with one mol of a benzoquinoline sulphonic acid according to the present invention to form the complete dyestuff.

As diamines of the formula H₂N—B—NH₂, as defined above, advantageously 4.4'-diaminodiphenyl-3.3'-dicarboxylic acid, 4.4'-diamino-3.3'-dihydroxydiphenyl as well as 4.4'-diamino-3.3'-dimethoxydiphenyl, the homologues and derivatives of the latter substituted at the methyl groups such as e. g. 4.4'-diamino-3.3'-di-(carboxy-methoxy)-diphenyl are used. Examples of such dinuclear derivatives having a bridging member which can be used are N₁ - (4' - amino - 3' - hydroxybenzoyl) - 1.4 - phenylendiamine - 3 - carboxylic acid, 4.4' - di - (4" - amino-3" - hydroxybenzoyl) - amino - 3.3' - dimethoxydiphenyl, 4.4' - diamino - 2.2' - dimethyl - 5.5' - dimethoxydiphenyl urea and 4.4'-diamino-diphenyl urea-3.3'-dicarboxylic acid.

The new polyazo dyestuffs are dark powders which dissolve in the form of their alkali salts, e. g. the lithium, potassium, sodium salts and also in the form of their ammonium salts, in water with an olive, green, blue to grey colour according to the composition.

The polyazo dyestuffs are very valuable for the dyeing of cellulose material, in particular, of cotton. The dyestuffs draw onto this material from their aqueous solutions in the warm and in the presence of Glauber's salt and are fixed on the fibres by known methods by treatment with agents giving off copper. The dyeings are fast to wet and light. Such polyazo dyestuffs according to the present invention as have sufficient water solubility in the form of copper complex compounds, can also be used as such for the dyeing of cellulose-containing material. They produce dyeings which have very good fastness to light, good wet fastness properties and some of them have the advantageous property that, on subsequent anti-crease processing of the dye goods, the dyeings undergo no undesirable change in shade nor is the fastness to light noticeably impaired.

Such dyestuffs which contain copper bound in complex linkage are produced by known methods by treatment with agents giving off copper, advantageously in aqueous solution or suspension at a raised temperature.

The following examples illustrate the invention without limiting it in any way. Where not otherwise stated, in the examples parts are given as parts by weight and the temperatures are in degrees centigrade. The relationship of parts by weight to parts by volume is as that of kilogrammes to litres.

*Example 1*

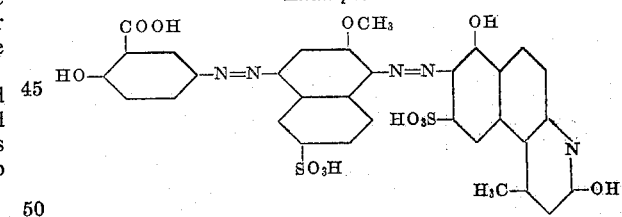

41.7 parts of the aminoazo dyestuff from diazotised 5-amino-2-hydroxybenzene-1-carboxylic acid and 1-amino-2-methoxy-naphthalene-6-sulphonic acid are dissolved at 15° in 1500 parts of water in the presence of a little sodium carbonate. A solution of 7.6 parts of sodium nitrite in 20 parts of water is then added and the whole is poured into 42 parts of 30% hydrochloric acid and 80 parts of water of 15°. After stirring for several hours, the pale brown diazo compound has formed whereupon it is cooled with ice to 0–5° and poured into a soda alkaline solution of 32.3 parts of 2-hydroxy-4-methyl-5.6-(3'-hydroxy-benzo)-quinoline-5'-sulphonic acid in 1000 parts of water containing 10 parts by volume percent of pyridine. The coupling is completed after a short time whereupon the dyestuff is precipitated with a little sodium chloride, filtered off and washed.

In this way, a disazo dyestuff is obtained which is suitable chiefly for the dyeing of cellulose fibres. The wet and light fastness of the blue-grey dyeings thereof can be considerably improved by after treatment with copper salt solutions.

In the following table other dyestuffs are listed which can be obtained in a similar manner. The dyeings thereof on cotton and regenerated cellulose when after coppered also have very good fastness properties.

| No. | Starting component | Middle component | End component | Shade |
|---|---|---|---|---|
| 1 | HO-[benzene]-COOH, NH₂ | OCH₃-[naphthalene]-NH₂, SO₃H | HO-[naphthalene fused pyridine]-SO₃H, CH₃, N, OH | Greenish blue. |
| 2 | HO-[benzene]-COOH, NH₂ | OCH₃-[naphthalene]-NH₂, SO₃H | H₃C, OH, HO-[phenanthridine type]-N, HO₃S, OH | Do. |
| 3 | HO-[benzene]-COOH, NH₂ | OCH₃-[naphthalene]-NH₂, SO₃H | HO-[phenanthridine]-HO₃S, CH₃, N, OH | Blue-grey. |
| 4 | HO-[benzene]-COOH-NH-CO-[benzene]-NH₂ | OCH₂COOH-[naphthalene]-NH₂ | OH-[phenanthridine]-HO₃S, H₃C, N, OH | Do. |
| 5 | HO-[benzene]-COOH-NH-CO-[benzene]-NH₂ | OCH₂COOH-[naphthalene]-NH₂ | OH-[phenanthridine]-SO₃H, CH₃, N, OH | Greenish grey. |
| 6 | HO-[benzene]-COOH-NH-CO-[benzene]-NH₂ | OCH₂COOH-[naphthalene]-NH₂, SO₃H | OH-[phenanthridine]-HO₃S, CH₃, N, OH | Blue grey. |
| 7 | HO-[benzene]-COOH-NH-CO-[benzene]-NH₂ | OCH₂COOH-[naphthalene]-NH₂, SO₃H | HO-[phenanthridine]-SO₃H, CH₃, N, OH | Greenish blue. |
| 8 | HO-[benzene]-COOH-NH-CO-[benzene]-NH₂ | OCH₃-[benzene]-NH₂, CH₃ | OH-[phenanthridine]-HO₃S, H₃C, N, OH | Blue. |

| No. | Starting component | Middle component | End component | Shade |
|---|---|---|---|---|
| 9 | (structure: HO—[ring-COOH]—NH—CO—[ring]—NH₂) | (structure: OCH₃, CH₃, NH₂ on ring) | (structure: OH, SO₃H, CH₃, N, OH quinoline) | Do. |
| 10 | (structure: CH₃—[ring]—N=C(S)—[ring-SO₃H]—NH₂) | (structure: OCH₃, CH₃, NH₂ on ring) | (structure: OH, SO₃H, CH₃, N, OH quinoline) | Do. |
| 11 | (structure: CH₃—[ring]—N=C(S)—[ring-SO₃H]—NH₂) | (structure: OCH₃, NH₂, SO₃H on ring) | (structure: OH, SO₃H, CH₃, N, OH quinoline) | Greenish blue. |
| 12 | (structure: HO—[ring-COOH]—NH₂) | (structure: OC₂H₅, NH₂, SO₃H on ring) | (structure: OH, SO₃H, CH₃, N, OH quinoline) | Do. |
| 13 | (structure: HO—[ring-COOH]—NH—CO—[ring]—NH₂) | (structure: OC₂H₅, NH₂, SO₃H on ring) | (structure: OH, SO₃H, CH₃, N, OH quinoline) | Do. |

Example 2

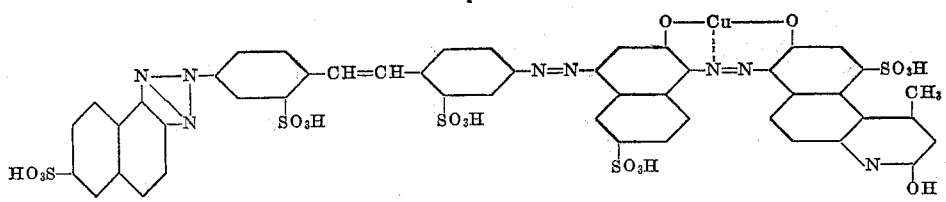

60.2 parts of 4'-amino-4-(6'-sulphonaphtho-1'.2':4.5-triazolyl-(2))-stilbene-2.2'-disulphonic acid, obtained in the known manner, are diazotised and coupled in acetic acid solution with 26 parts of 1-amino-2-methoxynaphthalene-6-sulphonic acid. The aminoazo dyestuff so obtained is further diazotised by dissolving in 1500 parts of water at 15° in the presence of a little sodium carbonate, adding a solution of 7.6 parts of sodium nitrite in 20 parts of water and pouring the whole into 42 parts of 30% hydrochloric acid and 80 parts of water at 15°. The pale brown diazo compound forms after stirring for some hours. It is cooled with ice to 0–5° and poured into an ammoniacal solution of 32.3 parts of 2-hydroxy-4-methyl-5.6-(4'-hydroxybenzo)-quinoline-6'-sulphonic acid in 1000 parts of water which contains 10% by volume of pyridine. The coupling is complete in a short time whereupon the dyestuff is precipitated with a little sodium chloride, filtered off and washed free of pyridine. In this way a disazo dyestuff is obtained which can be converted in the known manner with copper sulphate in the presence of sodium acetate, into the copper complex. It dyes cotton and cellulose material in green shades which have very good fastness to light. The shade and the fastness to light are only slightly influenced by anti-crease processing.

If in this example, instead of 4'-amino-4-(6'-sulphonaphtho - 1'.2':4.5 - triazolyl - (2) - stilbene - 2.2' - disulphonic acid, 4'-amino-4-(5'-sulphonaphtho-1'.2':4.5-triazolyl - (2)) - stilbene - 2.2' - disulphonic acid or 4'-amino - 4 - (4'' - methoxybenzene azo) - stilbene - 2.2'-disulphonic acid are used and otherwise the same procedure is followed, then dyestuffs are obtained which dye cotton in green shades which have similar good fastness properties.

Example 3

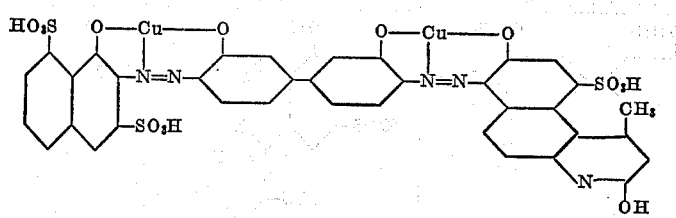

24.4 parts of o-dianisidine are tetrazotised in the usual way and poured at 0–5° into a solution of 30.4 parts of 1-hydroxynaphthalene-3.8-disulphonic acid and 35 parts of sodium carbonate in 1000 parts of water. The diazo monoazo dyestuff completely precipitates after a short time and no more tetrazonium compound can be traced. A soda-alkaline solution of 32.2 parts of 2-hydroxy-4-methyl-5.6-(4'hydroxybenzo)-quinoline-6'-sulphonic acid is then added and the whole is stirred until the coupling is complete. The disazo dyestuff obtained in this way is precipitated with sodium chloride, filtered off and again dissolved in 2500 parts of water at 80–85°. 400 parts of a copper oxide-ammonia solution containing 50 parts of crystallised copper sulphate and 120 parts of concentrated aqueous ammonia, are added and the whole is stirred at this temperature for 4–5 hours. After the addition of a further 50 parts of concentrated ammonia solution the temperature is raised to 90–95° for 15–20 hours. The copper complex formed is precipitated with sodium chloride, filtered off and dried. It is a dark powder which dissolves in water with a blue colour and which draws excellently from an aqueous bath onto cotton, linen and regenerated cellulose fibres. The dyeings have very good fastness to light and also the shade and fastness to light are barely influenced by anti-crease processing.

Further dyestuffs are given in the following table which are obtained in a similar manner by coupling tetrazotised o-dianisidine with the azo components in columns 1 and 2 and then converting the product into the copper complex.

They also dye cellulose material in reddish to greenish blue shades which have very good fastness properties.

| No. | Component A | Tetrazo compound | Component B | Shade |
|---|---|---|---|---|
| 1 | 1-hydroxy-8-sulfo-naphthalene-[structure with HO₃S, OH, SO₃H] | o-dianisidine | 2-hydroxy-4-methyl-5,6-(4'-hydroxybenzo)quinoline-6'-sulfonic acid | Blue. |
| 2 | 1-hydroxy-8-sulfo-naphthalene | o-dianisidine | hydroxy-methyl-quinoline derivative | Do. |
| 3 | 1-hydroxy-8-sulfo-naphthalene | o-dianisidine | hydroxy-methyl-quinoline derivative | Do. |
| 4 | 2-hydroxy-6-sulfo-naphthalene | o-dianisidine | hydroxy-methyl-quinoline derivative | Reddish blue. |
| 5 | 2-hydroxy-6-sulfo-naphthalene | o-dianisidine | hydroxy-methyl-quinoline derivative | Blue. |

| No. | Component A | Tetrazo compound | Component B | Shade |
|---|---|---|---|---|
| 6 | (naphthalene with HO₃S, OH, HO₃S, SO₃H) | (NH₂-C₆H₃(OCH₃)-C₆H₃(OCH₃)-NH₂) | (OH, HO₃S, H₃C, OH, N - quinoline type) | Do. |
| 7 | (naphthalene with HO₃S, OH, HO₃S, SO₃H) | (NH₂-C₆H₃(OCH₃)-C₆H₃(OCH₃)-NH₂) | (HO, SO₃H, CH₃, N, OH) | Greenish blue. |
| 8 | (naphthalene with HO, OH, HO₃S, SO₃H) | (NH₂-C₆H₃(OCH₃)-C₆H₃(OCH₃)-NH₂) | (HO, SO₃H, CH₃, N, OH) | Do. |
| 9 | (naphthalene with HO, OH, HO₃S, SO₃H) | (NH₂-C₆H₃(OCH₃)-C₆H₃(OCH₃)-NH₂) | (OH, HO₃S, H₃C, N, OH) | Do. |
| 10 | (naphthalene with Cl, OH, HO₃S, SO₃H) | (NH₂-C₆H₃(OCH₃)-C₆H₃(OCH₃)-NH₂) | (HO, SO₃H, CH₃, N, OH) | Do. |
| 11 | (naphthalene with C₂H₅O, OH, HO₃S, SO₃H) | (NH₂-C₆H₃(OCH₃)-C₆H₃(OCH₃)-NH₂) | (HO, SO₃H, CH₃, N, OH) | Do. |
| 12 | (naphthalene with C₂H₅O, OH, HO₃S, SO₃H) | (NH₂-C₆H₃(OCH₃)-C₆H₃(OCH₃)-NH₂) | (H₃C, OH, HO, N, HO₃S) | Do. |
| 13 | (naphthalene with CH₃COHN, OH, HO₃S, SO₃H) | (NH₂-C₆H₃(OCH₃)-C₆H₃(OCH₃)-NH₂) | (OH, HO₃S, N, H₃C, OH) | Blue. |
| 14 | (naphthalene with OH, C₆H₅-NH, SO₃H) | (NH₂-C₆H₃(OCH₃)-C₆H₃(OCH₃)-NH₂) | (OH, HO₃S, N, H₃C, OH) | Do. |

Example 4

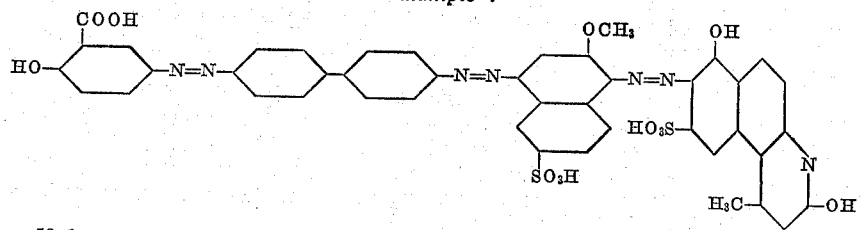

59.6 parts of the amino disazo dyestuff produced in the known manner from tetrazotised benzidine, 2-hydroxybenzene-1-carboxylic acid and 1-amino-2-methoxynaphthalene-6-sulphonic acid are diazotised as described in Example 1 and coupled, in the presence of pyridine, with 32.2 parts of 2-hydroxy-4-methyl-5.6-(3′-hydroxybenzo)-quinoline-5′-sulphonic acid in a soda alkaline medium to from the trisazo dyestuff. On completion of the coupling, the trisazo dyestuff is precipitated with a little sodium chloride, isolated, pyridine adhering thereto is removed by washing with diluted salt solution and then it is dried.

The trisazo dyestuff produced in this way dyes cotton and regenerated cellulose from an aqueous bath in blue-green shades. When after-treated with copper salt solutions, the dyeings have excellent wet and light fastness properties.

If 2-hydroxy-4-methyl-5.6-(4′-hydroxybenzo)-quinoline-6′-sulphonic acid is used instead of 2-hydroxy-4-methyl-5.6-(3′-hydroxy-benzo)-quinoline-5′-sulphonic acid, then a dyestuff is obtained the olive dyeing on cotton of which, when after coppered, has similar good properties.

The trisazo dyestuff obtained in this way dyes cotton and regenerated cellulose in blue grey shades the wet and light fastness properties of which can be considerably improved by after treatment with copper salt solutions.

A similar dyestuff is obtained which has similar fastness properties if 2-hydroxy-4-methyl-7.8-(6′-hydroxybenzo)-quinoline-4′-sulphonic acid is used instead of 2-hydroxy-methyl-5.6-(3′-hydroxybenzo) - quinoline - 5′ - sulphonic acid.

Example 6

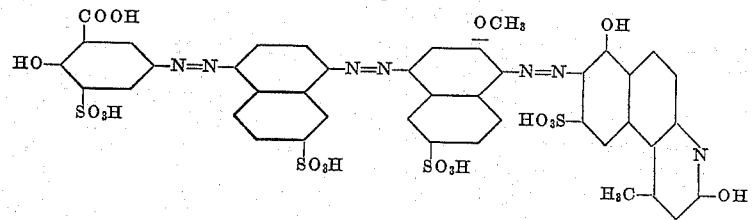

46.7 parts of the aminoazo dyestuff from diazotised 5-amino-3-sulpho-2-hydroxybenzene - 1 - carboxylic acid and 1-aminonaphthalene-7-sulphonic acid are diazotised as described in Example 1 and coupled, in the presence of sodium acetate, with 25.3 parts of 1-amino-2-methoxy-naphthalene-6-sulphonic acid, the medium being acid to litmus paper. The amino disazo dyestuff formed is further diazotised in the same manner and coupled, in the presence of pyridine, with an ammoniacal solution of 32.3 parts of 2-hydroxy-4-methyl-5.6-(3′-hydroxybenzo)-quinoline-5′-sulphonic acid. The trisazo dyestuff formed dyes cotton in blue-green shades and the dyeings are very fast

Example 5

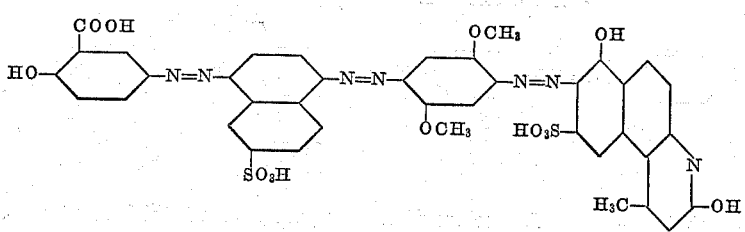

38.7 parts of the aminoazo dyestuff from diazotised 5-amino-2-hydroxybenzene-1-carboxylic acid and 1-aminonaphthalene-6-sulphonic acid are diazotised as described in Example 1 and coupled in the presence of sodium acetate with 15.3 parts of 1-amino-2.5-dimethoxybenzene, the medium being acid to litmus paper. The amino disazo dyestuff formed is further diazotised in the same way and coupled, in the presence of pyridine, with an ammoniacal solution of 32.2 parts of 2-hydroxy-4-methyl-5.6 - (3′ - hydroxybenzo) - quinoline - 5′ - sulphonic acid.

to wet and light on after treatment with copper salt solutions.

If, instead of 2-hydroxy-4-methyl - 5.6 - (3′ - hydroxybenzo)-quinoline-5′-sulphonic acid, 2-hydroxy-4-methyl-5.6-(4′-hydroxybenzo)-quinoline-6′-sulphonic acid or 2-hydroxy-4-methyl-7.8-(6′-hydroxybenzo) - quinoline - 4′-sulphonic acid is used, then dyestuffs are obtained which, when after coppered, dye cellulose material in grey-green shades which have very good wet and light fastness properties.

Example 7

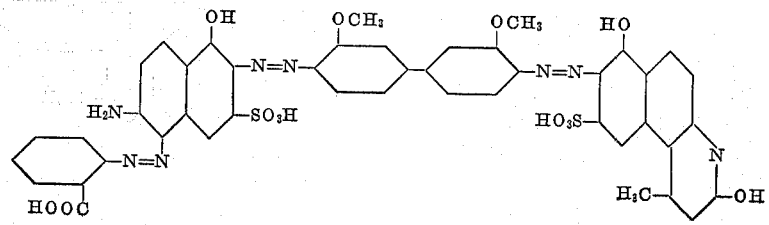

24.4 parts of o-dianisidine are tetrazotised in the usual way and poured into a solution of 38.7 parts of the aminoazo dyestuff obtained by acid coupling of diazotised 2-aminobenzene-1-carboxylic acid and 2-amino-5-naphthol-7-sulphonic acid, and 35 parts of sodium carbonate in 1000 parts of water. The addition is made at 0–5°. After a short time, the diazo-disazo dyestuff has completely precipitated and no more tetrazonium compound can be traced. A soda alkaline solution of 32.2 parts of 2-hydroxy-4-methyl-5.6-(3'-hydroxybenzo)-quinoline - 5'- sulphonic acid is then added and the whole is stirred until the coupling is complete. The trisazo dyestuff obtained in this manner is precipitated with sodium chloride, isolated and dried. It dyes cotton in dark navy blue shades which, when after coppered, have very good fastness to light.

If in this example, the 2-hydroxy-4-methyl-5.6-(3'-hydroxybenzo)-quinoline-5'-sulphonic acid is replaced by 2-hydroxy-4-methyl-7.8-(6' - hydroxybenzo) - quinoline-4'-sulphonic acid, then a similar dyestuff is obtained which also has very good fastness to light.

*Example 8*

2 parts of one of the dyestuffs obtained according to Example 2 or 3 are dissolved in a dyebath in 3000 parts of water and 1 part of sodium carbonate. 100 parts of cotton are entered at 40–50°, the bath is heated within 30 minutes to 90–95°, 30 parts of sodium sulphate are added and dyeing is continued for 45 minutes at the temperature given above. After this time, the dyed goods are rinsed cold in the usual way and dried. The cotton is dyed in this manner in olive green shades which have good wet fastness and very good light fastness properties.

If, in the dyeing process, a dyestuff according to Example 1, 4, 5, 6 or 7 is used, then the dyed cotton is aftertreated, after rinsing, in a fresh bath with 2 parts of copper sulphate and 2 parts of acetic acid for 30 minutes at 70°. The goods are then rinsed cold and dried. The wet and light fastness properties of these dyeings are considerably increased in this manner.

What I claim is:

1. A polyazo dyestuff which corresponds to the formula:

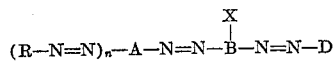

wherein

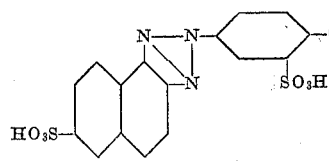

D represents the radical of a 2-hydroxy-4-methyl-(hydroxy-sulphobenzo)-quinoline bound in o-position to the hydroxyl group in the isocyclic ring, B represents a member selected from the group consisting of 2-alkoxy-1.4-phenylene, 2-alkoxy-1.4-naphthylene and 3.3'-dialkoxy-4.4'-diphenylene radicals, X represents a metallisable group ortho to the third azo linkage, A represents an aromatic radical selected from the group consisting of radicals of the benzene, naphthalene, stilbene and 2-phenyl-benzthiazole series, R represents a member selected from the group consisting of o - carboxyphenyl and o - hydroxycarboxyphenyl radicals n represents the numerals 0 and 1, and the complex copper compound thereof.

2. A polyazo dyestuff which corresponds to the formula:

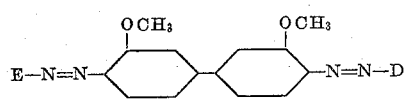

wherein

D represents the radical of a 2-hydroxy-4-methyl-(hydroxysulphobenzo)-quinoline bound in o-position to the hydroxyl group in the isocyclic ring, and E represents the radical of a hydroxynaphthalene sulphonic acid bound to the azo linkage in o-position to the hydroxyl group, and the complex copper compound thereof.

3. The polyazo dyestuff which corresponds to the formula:

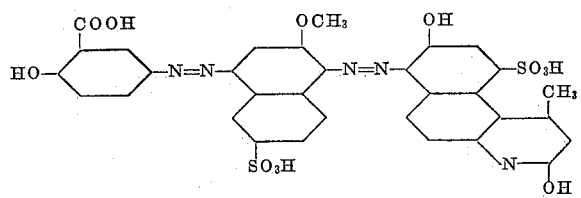

4. The cupriferous polyazo dyestuff which corresponds to the formula:

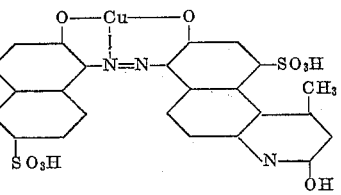
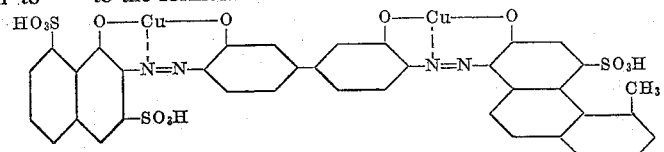

5. The cupriferous polyazo dyestuff which corresponds to the formula:

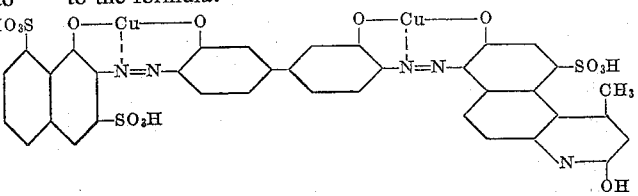
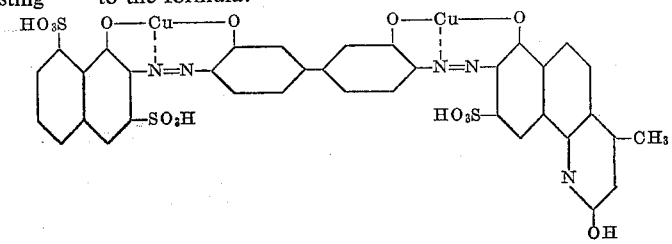

6. The cupriferous polyazo dyestuff which corresponds to the formula:

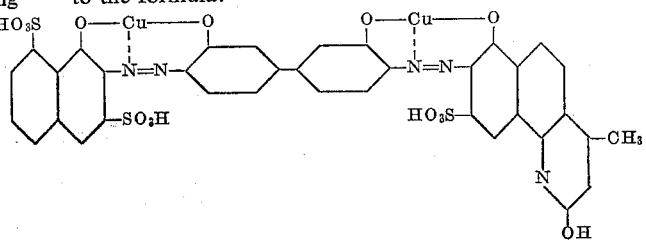

7. The cupriferous polyazo dyestuff which corresponds to the formula:
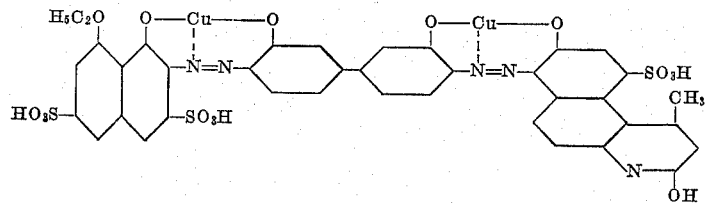
References Cited in the file of this patent
UNITED STATES PATENTS
2,025,991   Kunz et al. _____ Dec. 31, 1935
FOREIGN PATENTS
1,001,253   France _____ Oct. 24, 1951
302,404    Switzerland _____ Dec. 16, 1954
1,118,439   France _____ Mar. 19, 1956